United States Patent [19]

Sugiyama et al.

[11] Patent Number: 4,496,993
[45] Date of Patent: Jan. 29, 1985

[54] ROTARY RECORDING MEDIUM

[75] Inventors: Hiroyuki Sugiyama, Isehara; Masaki Sakurai; Ryozo Abé, both of Yokohama; Kenji Yoshihara, Chiba, all of Japan

[73] Assignee: Victor Company of Japan, Ltd., Yokohama, Japan

[21] Appl. No.: 375,535

[22] Filed: May 6, 1982

[30] Foreign Application Priority Data

May 12, 1981 [JP] Japan .................................. 56-70944

[51] Int. Cl.$^3$ .......................... G11B 27/00; H04N 5/76
[52] U.S. Cl. ...................................... 358/335; 360/48; 360/72.2; 369/30; 369/47
[58] Field of Search .................. 358/342, 335; 360/18, 360/27, 48, 72.2; 369/30, 47

[56] References Cited

U.S. PATENT DOCUMENTS 4,167,759 9/1979 Tachi .............................. 360/72.2 X
4,296,491 10/1981 Jerome ........................... 360/72.2 X

FOREIGN PATENT DOCUMENTS 3028932 2/1981 Fed. Rep. of Germany .
2939912 4/1981 Fed. Rep. of Germany .
2409572 11/1978 France .
2467520 10/1980 France .
2495871 11/1981 France .
1539728 1/1979 United Kingdom .

OTHER PUBLICATIONS

Patent Abstracts of Japan, vol. 3, No. 102 E-133, Aug. 29, 1979, pp. 13 E 133 & JP-A-54 79004.
Patent Abstracts of Japan, vol. 4, No. 156 (P-34)(638), Oct. 31, 1980, pp. 164 p 34 & JP-A-55 105873.
Electronic Engineering, vol. 52, No. 642, Sep. 1980, London (GB), "Technology Focus: Video Discs—A Triquetral Marketplace", pp. 129-165, p. 129, right col.; p. 138, right col.; p. 142, left col., lines 1-7, FIG. 9.

Primary Examiner—Robert L. Richardson
Attorney, Agent, or Firm—Louis Bernat

[57] ABSTRACT

A rotary recording medium is recorded with a program information signal and an address signal having a predetermined code in correspondence with the program information signal within a program information signal recorded section. This rotary recording medium is recorded with an address signal having a code different from the code of the address signal recorded within the program information signal recorded section, in a section or sections other than the above program information signal recorded section.

7 Claims, 8 Drawing Figures

ROTARY RECORDING MEDIUM

BACKGROUND OF THE INVENTION

The present invention generally relates to rotary recording mediums, and more particularly to a rotary recording medium recorded with an address signal having a code different from that of an address signal recorded at a section of the rotary recording medium where a program information signal is recorded, at sections other than the above section, such as lead-in and lead-out sections of the rotary recording medium.

Generally, in a rotary recording medium recorded with a program information signal such as a video signal and a PCM audio signal, a lead-in section and a lead-out section are respectively provided on the outer peripheral side and the inner peripheral side of a recorded section where the program information signal is recorded. In these lead-in and lead-out sections of the rotary recording medium, the information signal is not recorded.

When reproducing the above type of a rotary recording medium from the beginning of the program, a reproducing element is lowered onto the lead-in section of the rotary recording medium. Accordingly, in order to start reproduction of the program information signal within a short period of time from the time manipulation is performed to put a reproducing apparatus in a reproduction starting mode, it becomes necessary to shift and transfer the reproducing element which has been lowered within the lead-in section up to a recording starting end position where the program information signal starts at a relatively high speed. When shifting and transferring the reproducing element at a high speed to perform the above operation, it is desirable to positively detect the recording starting end position of the program information signal, that is, a position where the lead-in section terminates. In addition, it is further desirable to detect the remaining distance the reproducing element must be transferred in order to reach the above terminal end position of the lead-in section.

With respect to the lead-out section, it is necessary to positively detect when the reproducing element enters within the lead-out section. Moreover, in a case where the reproducing element is transferred past a terminal end position of the program information signal recorded section and enters within the lead-out section during an operational mode such as a high-speed search mode, the reproducing element must be returned to the starting end position of the lead-out section, that is, the terminal end position of the program information signal recorded section. Hence, it is also desirable to detect the position of the reproducing element within the lead-out section.

SUMMARY OF THE INVENTION

Accordingly, it is a general object of the present invention to provide a novel and useful rotary recording medium which satisfies the above described demands.

Another and more specific object of the present invention is to provide a rotary recording medium in which an address signal indication signal for indicating a time required for reproduction from a starting end of a section where a program information signal is recorded, or discriminating a plurality of programs and indicating positions of the respective plurality of programs from the starting end of the program information signal recorded section, is recorded within the program information signal recorded section, and an address signal having a code different from the code used in the program information signal recorded section is recorded in sections on the inner peripheral side and the outer peripheral side of the program information signal recorded section, respectively, where the program information signal are not recorded.

Still another object of the present invention is to provide a rotary recording medium in which the above address signal is recorded so that, the address signal decreases towards a recording starting end where the recording of the program information signal is started, within a lead-in section, and the address signal increases away from a recording terminal end where the recording of the program information signal is terminated, within a lead-out section of the rotary recording medium.

Other objects and further features of the present invention will be apparent from the following detailed description when read in conjunction with the accompanying drawings.

DETAILED DESCRIPTION

Figure 1A:
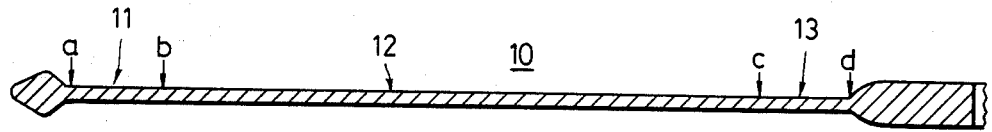
FIG. 1A shows a cross section of a rotary recording medium.

FIG. 1A shows a cross section of a rotary recording medium (hereinafter simply referred to as a disc) 10. A lead-in section 11 is provided between positions a and b, a section 12 recorded with a program information signal is provided between positions b and c, and a lead-out section 13 is provided between positions c and d. The program information signal is not recorded in the lead-in section 11 and the lead-out section 13.

Figure 1B:
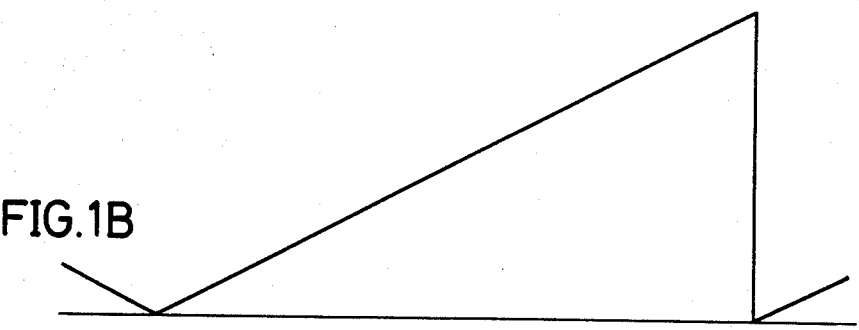
FIG. 1B is a diagram for explaining a time code of an address signal recorded on a rotary recording medium according to the present invention.

A time code signal having a time code indicated in FIG. 1B is recorded throughout the sections 11 through 13 as an address signal. The time code indicates a position on the disc 10 from the points b and c in time. In the lead-in section 11, the time code is recorded so that the time code is maximum at the outermost peripheral position a and gradually decreases towards the section 12 to become zero at the innermost peripheral position b in the lead-in section 11. In the program information signal recorded section 12, the time code is recorded so that the time code is zero at the outermost peripheral position b in the section 12 and gradually increases towards the lead-out section 13 to become maximum at the innermost peripheral position c in the section 12. Moreover, in the lead-out section 13, the time code is zero at the outermost peripheral position c in the lead-out section 13 and gradually increases to maximum at the innermost peripheral position d.

Figure 1C:
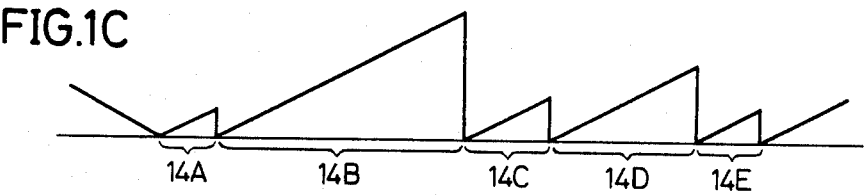
FIG. 1C is a diagram for explaining a chapter code in a manner similar to FIG. 1B.

In addition to the above time code signal, a chapter code signal having a chapter code indicated in FIG. 1C is recorded in the sections 11 through 13. This chapter code indicates the position within the program for each program. In the lead-in section 11, the chapter code is recorded so that the chapter code is maximum at the outermost peripheral position a and gradually decreases towards the section 12 to become zero at the innermost peripheral position b in the lead-in section 11. In the program information signal recorded section 12, the chapter code is recorded for each of recorded information signal programs 14A, 14B, . . . and 14E so that the chapter code is zero at the outermost peripheral end (beginning) of a program and gradually increases towards the innermost peripheral end (finish) of the program. In addition, in the lead-out section 13, the chapter code is zero at the outermost peripheral position c in the lead-out section 13 and gradually increases to become maximum at the innermost peripheral position d.

Figure 2:
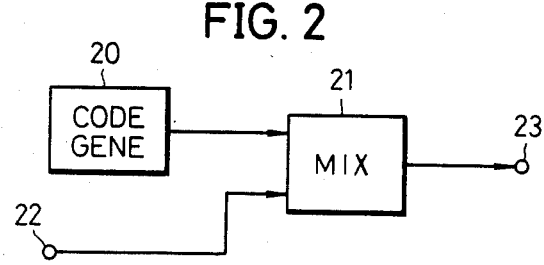
FIG. 2 is a systematic block diagram showing a part of a recording system for recording a rotary recording medium according to the present invention.

A part of a recording system for recording signals on the above disc 10, is shown in FIG. 2. A code generator 20 generates the above time code signal and the chapter code signal described in conjuction with FIGS. 1B an 1C. These signals are supplied to a mixing circuit 21. A video signal and an audio signal are supplied to the mixing circuit 21 through a terminal 22. The mixing circuit 21 inserts the time code signal and the chapter code signal into certain horizontal scanning periods within a vertical blanking period in each field of the video signal. When the video signal is of the NTSC system, the above signals are inserted within the seventeenth and the eighteenth horizontal scanning periods of the video signal. On the other hand, when the video signal is of the PAL or the SECAM system, the above signals are inserted within the fourteenth and the fifteenth horizontal scanning periods. The video signal thus inserted with the time code signal and the chapter code signal and the audio signal are obtained from an output terminal 23, and after being frequency-modulated in a circuit system (not shown), optically recorded onto an original disc by modulating a laser beam. Recording systems such as those disclosed in U.S. Pat. Nos. 4,315,283 and 4,322,836 may be used for the above recording system. The original disc which is thus optically recorded, is subjected to a known developing process. The original disc is used for the stamping in a predetermined disc manufacturing process, and as a result, a disc 10 formed with pits in accordance with the recorded signal is obtained.

Next, description will be given with respect to the constitution of the time code signal and the chapter code signal. The time code signal has a constitution shown in FIG. 3A. A code "1101" in binary code is assigned to a four-bit synchronizing block 30a. A two-bit line discriminating block 31a is provided for discriminating the time code and the chapter code. A code "10" in binary code is assigned to the block 31a to indicate a time code, and a code "11" in binary code is assigned to the block 31a to indicate a chapter code. A two-bit audio discriminating block 32a is provided to discriminate whether the audio signal is a monaural or stereo signal.

Blocks 33a through 36a respectively comprise four bits, and indicate the time. A four-bit block 37a indicates the track. The block 33a indicates the tens' column while the block 34a indicates the ones' column for indicating the minutes. The block 35a indicates the tens' column and the block 36a indicates the ones' column for indicating the seconds. When the video signal is of the NTSC system, the disc 10 is rotated at a rotational speed of fifteen revolutions per second by a turntable 41 in a reproducing system shown in FIG. 4. A reproducing element 43 advances by fifteen tracks per second towards the inner periphery of the disc. Accordingly, the first through fifteenth track is indicated by hexadecimal indications "0" through "E" by the four-bit block 37a. On the other hand, when the video signal is of the PAL or the SECAM system, the disc 10 is rotated at a rotational speed of 12.5 revolutions per second. Hence, the first through twelfth track, and the first through thirteenth track are alternately displayed, since the hexadecimal indications "0" through "B" (or "0" through "C") are obtained in the block 37a when the block 36a is even and the hexadecimal indications "0" through "C" (or "0" through "B") are obtained when the block 36a is odd. Therefore, the twenty-five tracks on the disc 10 the reproducing element 43 advances in two seconds, are accordingly indicated.

In the lead-in section 11 of the disc 10, the hexadecimal indication in the block 33a is "F". The time recorded in the blocks 34a through 37a gradually decreases from the position a towards the position b, as shown in FIG. 1B. At the position b, the blocks 33a through 37a all indicate a hexadecimal "0". In the program information signal recorded section 12, the time indicated by the blocks 33a through 37a gradually increases from the position b towards the position c. At the position c, the block 33a indicates a hexadecimal "E", while the blocks 34a through 37a all indicate a hexadecimal "0". Further, in the lead-out section 13, the block 33a indicates a hexadecimal "E", while the time recorded in the blocks 34a through 37a gradually increases from the position c towards the position d. A parity bit 38a is added to the block 37a. The parity bit 38a is provided for an odd parity bit (or even parity bit) with respect to a total number of twenty-eight bits in the blocks 30a through 37a.

Figure 3A:
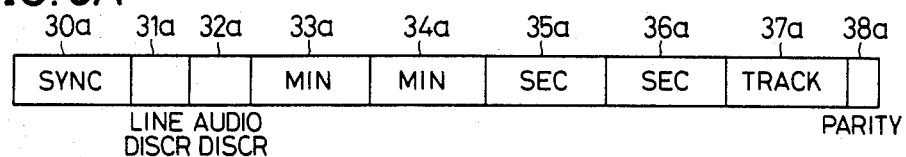
FIGS. 3A and 3B respectively are diagrams for explaining the constitution of a time code and a chapter code.
Figure 3B:
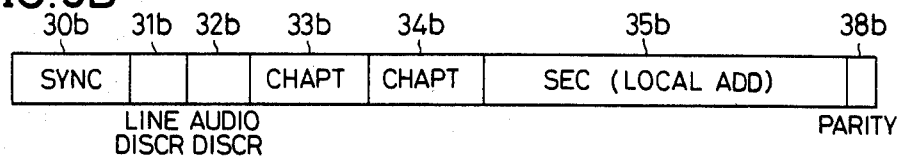

The chapter code has a constitution indicated in FIG. 3B. a synchronizing block 30b, a line discriminating block 31b, an audio block 32b, and a parity bit 38b are the same as those corresponding parts in the time code shown in FIG. 3A, and their description will be omitted. Blocks 33b and 34b respectively comprise four bits, and indicate the chapter number. The block 33b indicates the tens' column of the chapter number, and the block 34b indicates the ones' column of the chapter number. A block 35b comprises twelve bits, and indicates the time in seconds (hereinafter referrred to as local address) in binary code.

In the lead-in section 11 of the disc 10, hexadecimal "F" is respectively recorded in the blocks 33b and 34b. The local address of the block 35b gradually decreases from the position a towards the position b. At the position b, all the bits constituting the blocks 33b through 35b respectively indicate "0" in binary code. In the program information signal recorded section 12, the blocks 33b and 34b indicate "0" and "0" in hexadecimal code, respectively, and the local address in the block 35b gradually increases from "0" in binary code from the position b towards the position c, within the first program 14A. That is, the first program 14A is a zero chapter, and a trademark of the manufacturer, a comment explaining the contents of the recorded program, and the like are recorded therein. In the second program 14B, the blocks 33b and 34b indicate "0" and "1" in hexadecimal code, respectively, and the local address in the block 35b gradually increases from "0" in binary code from the position b towards the position c. Moreover, in the lead-out section 13, the chapter number in the blocks 33b and 34b are "E" and "E" in hexadecimal code, respectively, and the local address in the block 35b gradually increases from "0" in binary code from the position c towards the position d.

The above synchronizing blocks 30a and 30b and the line discriminating blocks 31a and 31b are respectively provided to obtain the address signal upon reproduction of the disc 10, and discriminate whether it is the time code or the chapter code.

Figure 4:
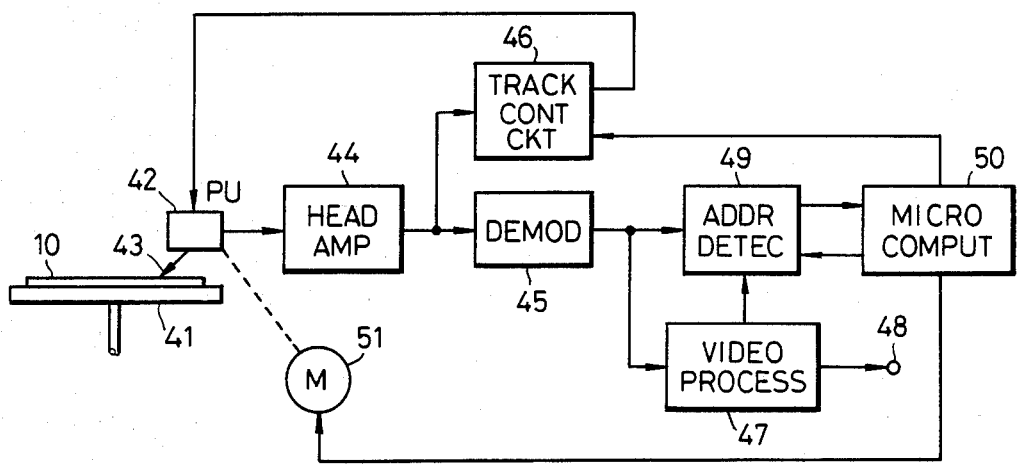
FIG. 4 is a systematic block diagram showing an example of a reproducing apparatus for reproducing a rotary recording medium according to the present invention.

Next, description will be given with respect to an example of a reproducing apparatus for reproducing the disc 10. In FIG.4, the disc 10 recorded with the address signal together with the video and audio signals, is rotated at a predetermined rotational speed by the turntable 41. A reproducing stylus 43 of a signal pickup device 42 makes contact with the recording surface of the disc 10, to pick up and reproduce the recorded signal from the disc 10. In the present example, the signal is recorded on the disc 10 as variations in geometrical configuration, and the above recorded signal is reproduced from the disc 10 as variations in electrostatic capacitance between the disc 10 and an electrode of the reproducing stylus 13. Further, reference signals for performing tracking control are recorded on the disc 10 besides the above signal, and these reference signals are reproduced together with the above signal.

The signal picked up and reproduced from the disc 10, is supplied to a demodulator 45 and a tracking control circuit 46 through a head amplifier 44. Reference signals for tracking control are separated at the tracking control circuit 46, and a tracking control signal is formed from these reference signals. The tracking control signal thus formed by the tracking control circuit 46 is supplied to a coil used for tracking provided within the signal pickup device 42. Accordingly, tracking control is performed so that the reproducing stylus 43 accurately scans over the video signal tracks on the disc 10.

On the other hand, the picked up video signal is demodulated at the demodulator 45, and then supplied to a video signal processing circuit 47 wherein a predetermined signal processing is performed. Hence, the demodulated video signal thus subjected to the predetermined signal processing, is supplied to a picture tube (not shown) of a receiver from a terminal 48, and reproduced as a reproduced picture. The signal from the demodulator 45 is also supplied to an address signal detection circuit 49 wherein an address signal within the signal thus supplied is detected. The detected address signal is supplied to a micro-computer 50.

Figure 5:
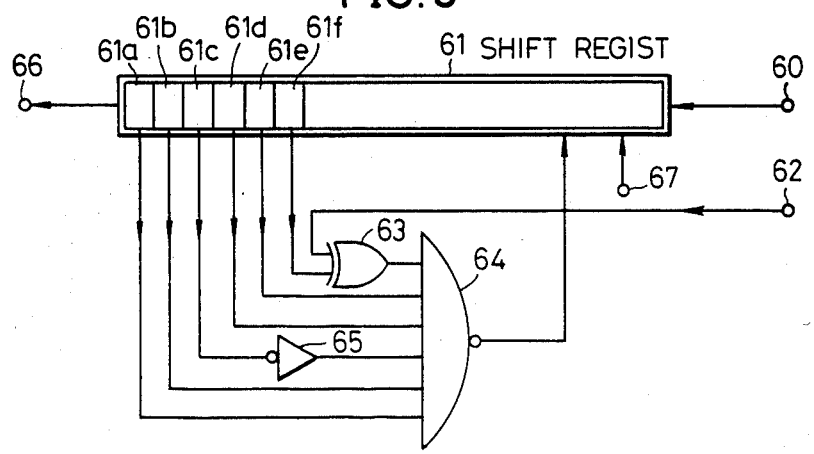
FIG. 5 is a concrete systematic block diagram showing a part of the block system shown in FIG. 4.

The address signal detection circuit 49 comprises a circuit system shown in FIG. 5, for example. The signal from the demodulator 45 is supplied to a shift register 61 through an input terminal 60, to shift the shift register 61 in terms of bits from the right to the left side in FIG. 5. On the other hand, a selection signal for selecting and obtaining either the time code or the chapter code from the micro-computer 50, is supplied to one input terminal of an exclusive-OR circuit 63 through an input terminal 62. For example, it will be first assumed that a signal indicating "1" for obtaining the time code, is supplied from the input terminal 62. Continuous blocks 61a through 61f in terms of bits, are provided in the shift register 61. Respective contents of these blocks 61a through 61f are read out, and supplied to the microcomputer 50 through a terminal 66. The signals read out from the blocks 61a, 61b, 61d, and 61e are directly supplied to a NAND circuit 64. The signal read out from the block 61c is supplied to the NAND circuit 64 after being inverted at an inverter 65. Moreover, the signal read out from the block 61f is supplied to the other input terminal of the exclusive-OR circuit 63. An output signal of the exclusive-OR circuit 63 is supplied to the above NAND circuit 64.

When the contents of the blocks 61a through 61f of the shift register 61 becomes "110110" in binary code, all the inputs to the NAND circuit 64 become "1". Accordingly, the output of the NAND circuit 64 becomes "0", and this output signal is supplied to the shift register 61. The shift register 61 stops the shifting operation when the output signal from the NAND circuit 64 becomes "0", and detects the contents of the time code by indivisually reading out blocks 32a through 38a shown in FIG. 3A which are provided within the shift register 61. In addition, when the chapter code is to be obtained, a signal "0" is supplied from the input terminal 62, and the shift register 61 stops the shifting operation when the contents of the blocks 61a through 61f becomes "110111". Hence, similarly as in the case described above, the contents of the chapter code may be obtained.

A vertical synchronizing signal from the video signal processing circuit 47, is applied to the shift register 61 through a terminal 67 as a clear pulse.

In the lead-in and lead-out sections 11 and 13, when the address signal indicates a time code, the contents of the block 33a is not limited to the hexadecimal indication "F" or "E". In addition, when the address signal indicates a chapter code, the contents of the blocks 33b and 34b are not limited to "E" and "F" or "E" and "E". By using other codes which are not used in the blocks 33a, 33b, and 34b in the program information signal recorded section 12, it is also possible to distinguish the lead-in section 11, the lead-out section 13, and the program information signal recorded section 13.

As described above, according to the disc 10 of the present invention, the address signal recorded in the lead-in section 11 and the lead-out section 13 has a code different from that of the address signal recorded in the program information signal recorded section 12. Accordingly, the position of the reproducing stylus 43 in the lead-in section 11 and the lead-out section 13 can be discriminated with ease, by use of the micro-computer 50. For example, when the reproducing stylus 43 is at a position within the lead-in section 11 near the position a, the value of the time code or the chapter code is large. Hence, an instruction is sent to a feed motor 51 from the micro-computer 50, to rotate the feed motor 51 at a high speed. Thus, the signal pickup device 42 is transferred at a high speed towards the inner peripheral direction of the disc 10. When the reproducing stylus 43 is fed towards the inner peripheral side of the disc 10 and reaches a position near the position b, the micro-computer 50 discriminates that the value of the time code or the chapter code has reached a value near zero. At this point in time, an instruction is sent to the feed motor 51 from the micro-computer 50, to return the rotational speed of the feed motor 51 back to the normal speed.

The reproducing stylus 43 shifts over tracks by the control provided by the tracking control circuit 46, and finally reaches the position b in a state under tracking control.

When the reproducing stylus 43 enters within the lead-out section 13 during a normal reproduction mode, the address signal in the lead-out section is discriminated by the micro-computer 50. Accordingly, the micro-computer 50 sends an instruction to the feed motor 51 to rotate this feed motor 51 at a high speed in the reverse direction. Thus, the signal pickup device 42 is returned to a resting position provided at the outer side from the disc 10. Furthermore, there are cases where the reproducing stylus 43 is fed past the program information signal recorded section 12 to enter into the lead-out section 12 during a manual high-speed search mode. The reproducing stylus 43 is fed past the program information signal recorded section 12 and enters within the lead-out section 13 in a similar manner, when a program number after the final program 14E which does not exist is erroneously set to initiate a cueing operation. In these cases, instructions are sent to the feed motor 51 and the tracking control circuit 46 to control these motor 51 and the circuit 46, because the position of the reproducing stylus 43 within the section 13 is discriminated by the micro-computer 50. Accordingly, control is performed so that the value of the time code or the chapter code becomes zero, that is, so that the reproducing stylus 43 is returned to the position c.

Further, the present invention is not limited to these embodiments, but various variations and modifications may be made without departing from the scope of the present invention.

What is claimed is:

1. A rotary recording medium comprising:
a continuous spiral main track including main track turns having an information signal and an address signal recorded thereon, said address signal being a signal based upon a first coding system for representing a location of the information signal on the main track turns; and
a continuous spiral lead-in track including lead-in track turns having no information signal recorded thereon, said lead-in track turns having an address signal recorded thereon based upon a second coding system which is different from the first coding system for representing a location of the lead-in track turns.

2. A rotary recording medium as claimed 1 in which said information signal is recorded in program units on said main track, and said address signal comprises a time code signal indicating the position of each of the track turns on said rotary recording medium in time, and a chapter code signal indicating the position of each of said program units.

3. A rotary recording medium as claimed in claim 1 which further comprises a continuous spiral lead-out track including lead-out track turns having no information signal recorded thereon, said lead-out track turns having an address signal recorded thereon based upon a third coding system different from the first and second coding systems for representing a location of the lead-out track turns.

4. A rotary recording medium as claimed in claim 3 in which a value indicated by said address signal decreases in said lead-in track towards said main track, and increases in said lead-out track towards said main track.

5. A rotary recording medium as claimed in claim 4 in which the value indicated by said address signal is zero at a terminal end of said lead-in track which continues to said main track, and is zero at a starting end of said lead-out track which continues from said main track.

6. A rotary recording medium as claimed in claim 1 in which said information signal comprises a video signal of a system using a field frequency of 60 Hz, four fields of said video signal are recorded over one main track turn on said rotary recording medium, and said address signal includes a code repeatedly recorded with a value between "0" and "14" for every fifteen track turns.

7. A rotary recording medium as claimed in claim 1 in which said information signal comprises a video signal of a system using a field frequency of 50 Hz, four fields of said video signal are recorded over one main track turn on said rotary recording medium, and said address signal includes a code alternately recorded with a value between "0" and "11", and "0" and "12" for every twelve track turns and for every thirteen track turns.

* * * * *